Dec. 3, 1968    G. MARCHIOLI    3,414,470
PROCESS AND MACHINE FOR MANUFACTURING ELBOWS
Filed Feb. 24, 1965    9 Sheets-Sheet 2

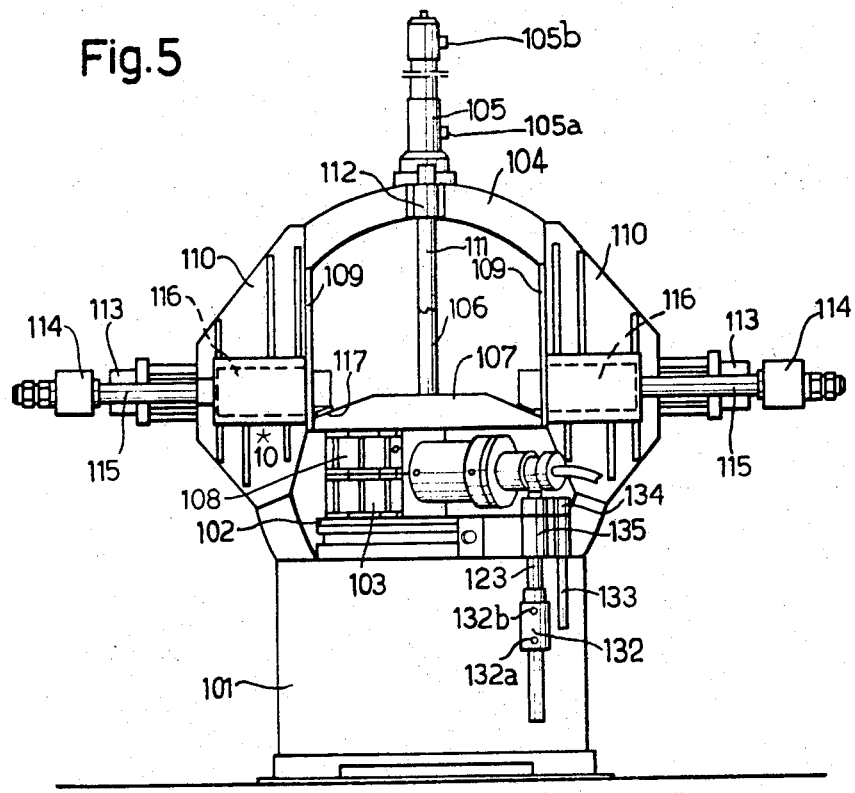

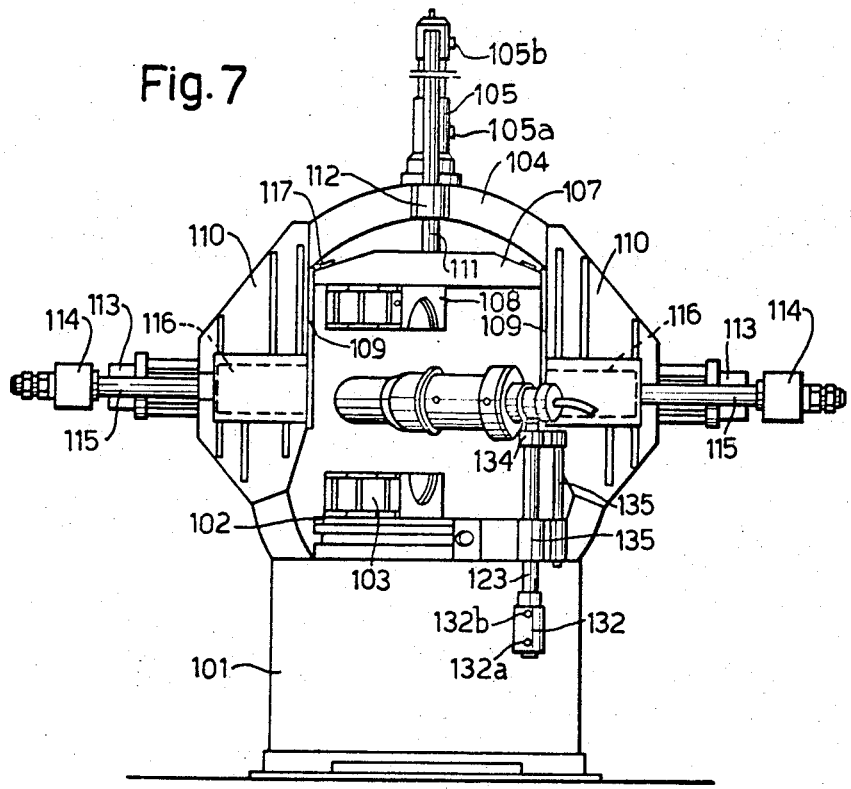

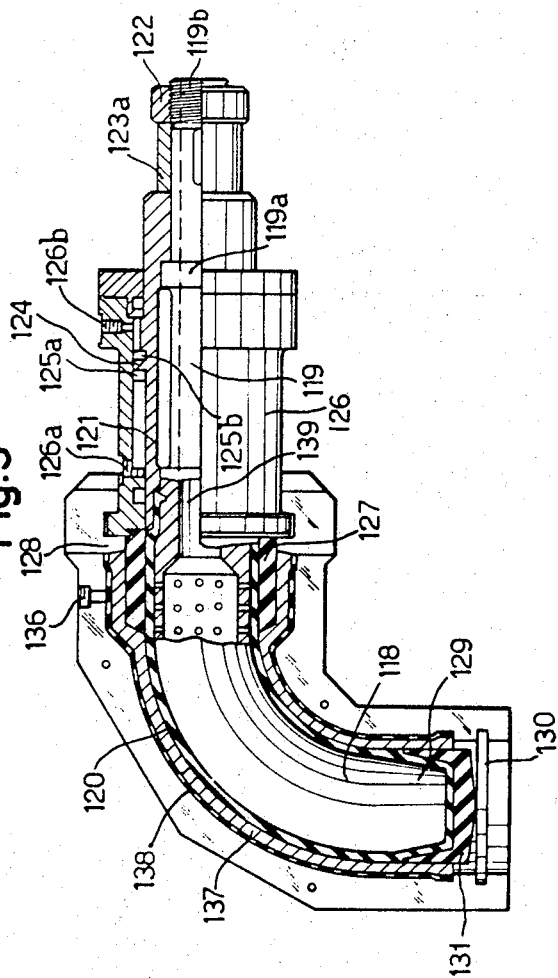

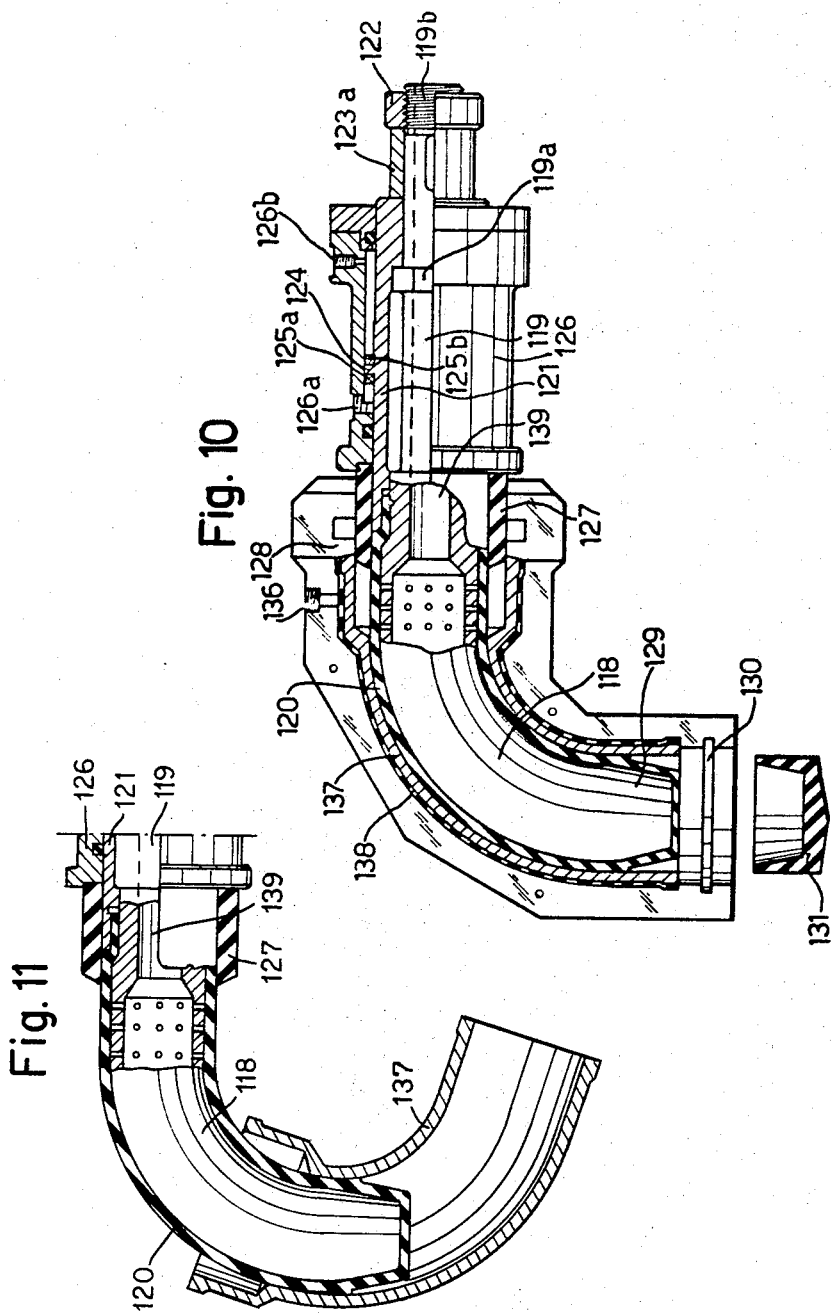

3,414,470
PROCESS AND MACHINE FOR
MANUFACTURING ELBOWS
Giorgio Marchioli, Milan, Italy, assignor to Societe
Anonyme Francaise Eternit Prouvy, Thiant, Nord,
France
Filed Feb. 24, 1965, Ser. No. 434,959
Claims priority, application Italy, Feb. 26, 1964,
4,620/64; Jan. 19, 1965, 2,012/65
11 Claims. (Cl. 162—218)

ABSTRACT OF THE DISCLOSURE

A process and machine for manufacturing pipe elbows having a curved intermediate portion and straight end portions, one of the end portions being shaped in the form of a socket. A split mold having permeable walls is positioned around a core having a rigid hollow body with permeable walls, a rubber jacket surrounding the hollow body, and a pair of removable annular elements normally positioned on the ends of the hollow body and being shaped to form the parts of the core which would normally hinder relative rotation of the core and the type section to be molded. A slurry of fibers and binder is introduced into the cavity between the core and the mold and is simultaneously compressed and dehydrated. The annular elements are removed to allow the rest of the core to be withdrawn from the molded pipe section by rotating that portion of the core about the axis of curvature of the pipe section.

---

This invention relates to a method and machine for manufacturing pipe elbows having straight terminal portions one of which is of socket shape, and a curved intermediate portion.

Processes and machines for manufacturing elbows of circular or rectangular cross sectional shape are known. Such devices simultaneously compress and dehydrate a watery slurry containing fibers and a binder in the hollow of a permeable mold which opens in an axial plane. The mold is closed at its opposite ends by removable plates and encloses a coaxial core which is capable of expanding and is made up of a number of elements which can be separately removed from the mold.

By the known process and machine, which are more particularly suitable for manufacturing elbows of cementitious material, especially asbestos-cement, it is not possible to manufacture elbows of a wide radius of curvature. Such processes and machines can only be used to produce elbows which sharply change in direction and cross section and are formed inside with sharp edges, so that they are hardly suitable for conveying fluids.

This invention provides a process and machine for inexpensively manufacturing elbows of the above-mentioned type, which satisfactorily meet the requirements of fluid dynamics and contain no sharp edges or sharp changes in cross section and direction.

With this object in view, this invention provides a process and machine of the type referred to above, wherein the core is removed from the molded elbow by relatively rotating the core and elbow after removal from the opposite end portions of the core elements which would hinder rotation of the core with respect to the elbow should the core be made of one piece, or vice versa.

According to one embodiment of the process, the core is removed from the mold on completion of molding by rotating the core about an axis which is at the same time the axis of common and constant curvature of the mold portion forming the intermediate curved portion of the elbow and of the cooperating core portion. The rotation of the core is effected, as just mentioned, upon removal of the core elements from the opposite end portions which would hinder rotation of the core within the mold on completion of molding of the elbow.

According to one modification, the elbow can be removed from the mold by releasing the core and surrounding material of the elbow formed thereon from the mold portions, removing said mold portions from one another and the core so that the elbow is further carried by the core. The elbow is then slipped away from the core upon removal from the end portion of the elbow of the core elements which would hinder the substantially circular movement of the elbow with respect to the core about the axis of curvature of the core, should the core be of one piece construction.

This invention further provides a machine for carrying out the above defined process. The machine comprises an external divided mold made up of two permeable mold halves, which are adapted to juxtapose along a horizontal plane and define from the outside a hollow, comprising a straight portion forming the elbow socket and a constant curvature portion ending by a straight portion which forms remaining elbow portion, and further comprises a core made up of a main element and supplemental elements forming the inside of the socket and of the opposite terminal elbow portion, which can be axially removed from the main element and are of a configuration such as to form such parts of the core at least which prevent separation of the elbow formed on the core by a relative rotational movement should the core be made of one piece.

The core elements, which would hinder rotation of the core relatively to the elbow formed thereon, are arranged at the straight end core portions which form the inside of the socket and of the opposite end portion of the elbow. The movement of said elements with respect to the main core elements is effected by jacks which are supported at the closure plates for the opposite mold ends.

According to a first embodiment, the machine for carrying out the above referred to process provides a mold having a central constant curvature portion and two straight end portions, one of which is of socket shape. The core comprises a main element mounted for rotation about an axis which is the common axis of curvature of the middle portion of the mold and core and, at each of its ends, elements adapted to form the inner surface of the socket and the opposite end portion, respectively, of the elbow to be manufactured. One supplemental element at least, is mounted in the machine in such manner that it can be removed from the mold independently of the said main element, the supplemental elements being constructed and arranged to form the parts of the end core sections which would hinder rotation thereof about said axis and stripping of the mold on completion of molding of the elbow, should the core be made of one piece.

According to a further embodiment the mold in the machine is closed at its ends by cross walls each made up of two elements fast with each mold half, respectively. An opening is formed in the cross wall closing from the outside the mold portion in which the elbow is formed. The opening is so dimensioned as to let the rigid stem supporting the core through in a known manner and permit removal of the associated supplemental core element, said stem being moreover supported by means adapted to lift it together with the core and, possibly, with the elbow formed on the core above the bottom mold half after opening of the mold.

Further characteristics, features and advantages of this invention will be understood from the appended description of embodiments shown on the accompanying drawings, wherein:

FIGURE 5 is a front elevational view of a further embodiment showing the mold in a closed condition.

FIGURE 7 is a front elevational view similar to FIGURE 5 showing the machine with the mold in an open condition and the molded elbow lifted from the bottom mold half;

FIGURE 9 is an axial sectional view in a horizontal plane, showing the mold and core during molding of the elbow;

FIGURE 10 is a sectional view similar to FIGURE 9 showing the parts after lifting of the core and elbow formed thereon above the bottom mold half and after slipping the straight end portions of the elbow off the supplemental core elements, and FIGURE 11 is an axial sectional view showing the elbow partly stripped from the core.

Figure 1:
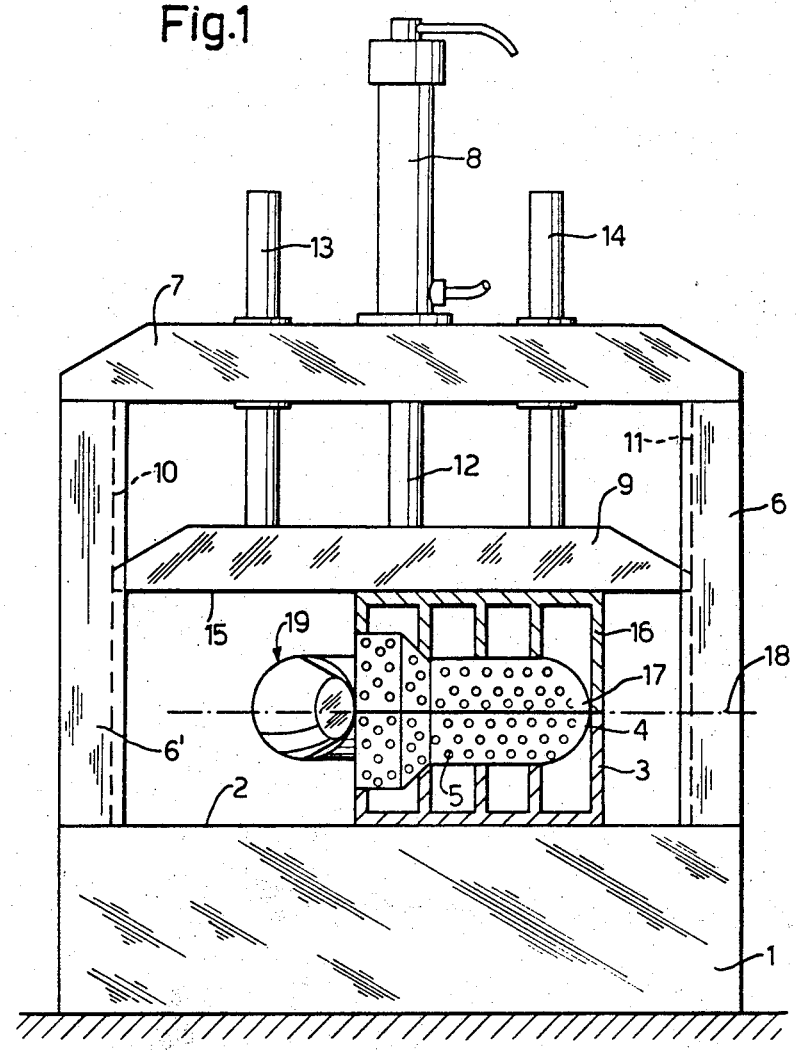
FIGURE 1 is a part sectional diagrammatical side elevational view of the machine according to a first embodiment.

The machine shown in FIGURES 1 to 4 comprises a bed plate 1 having secured to its top 2 a rest 3 for the bottom half 4 of a mold in the sidewall of which is provided through holes 5.

Figure 2:
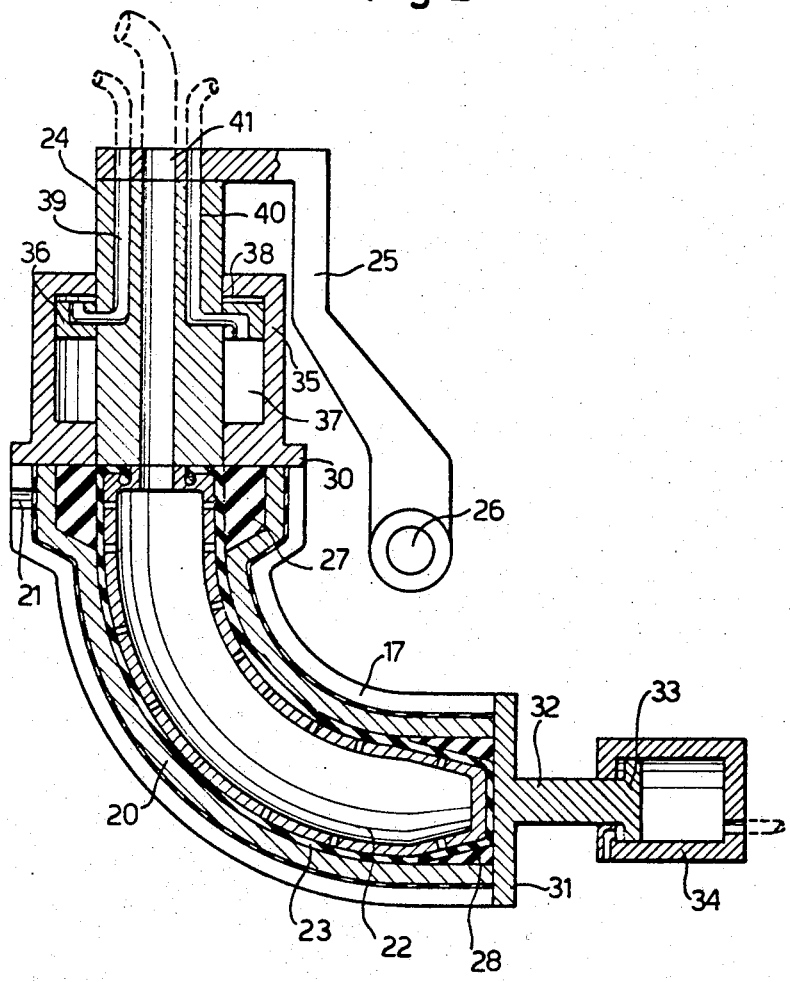
FIGURES 2, 3 and 4 show main components of the machine according to this invention in three different mutual positions at three consecutive operational steps of the machine.
Figure 3:
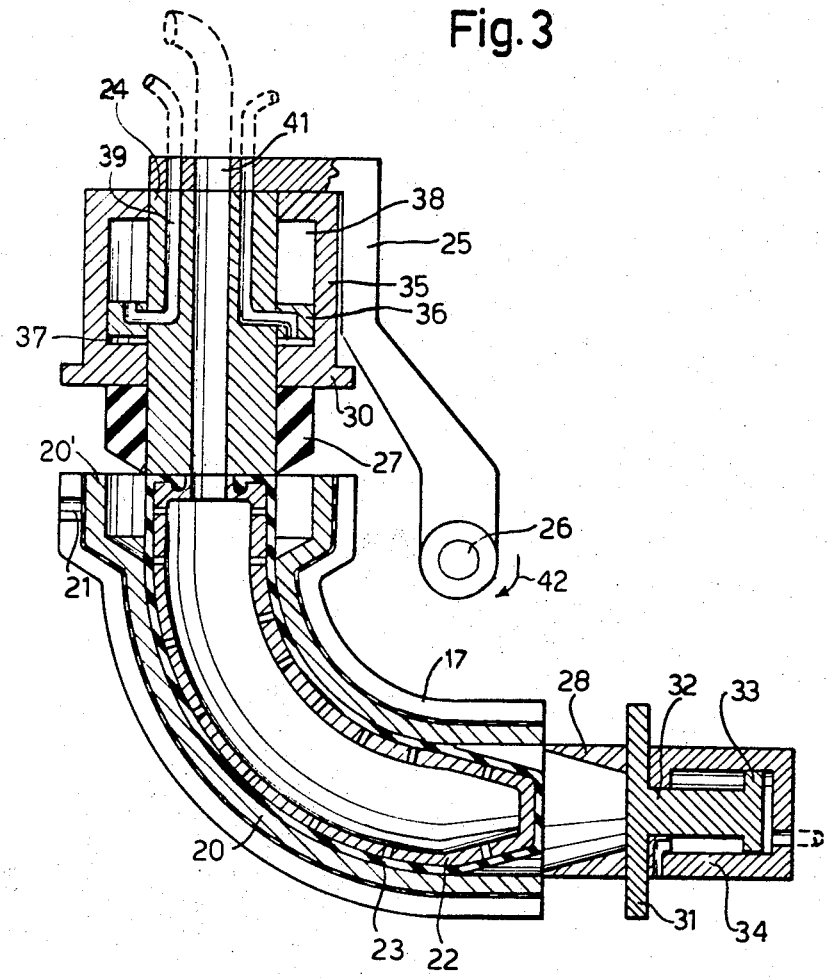
Figure 4:
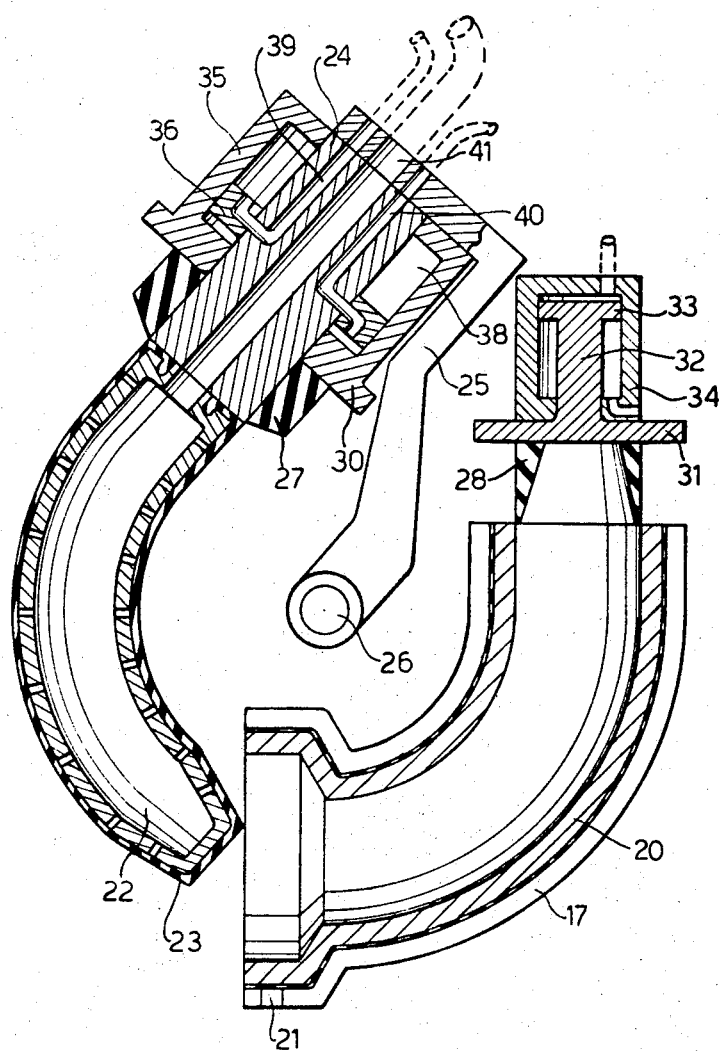
Figure 8:
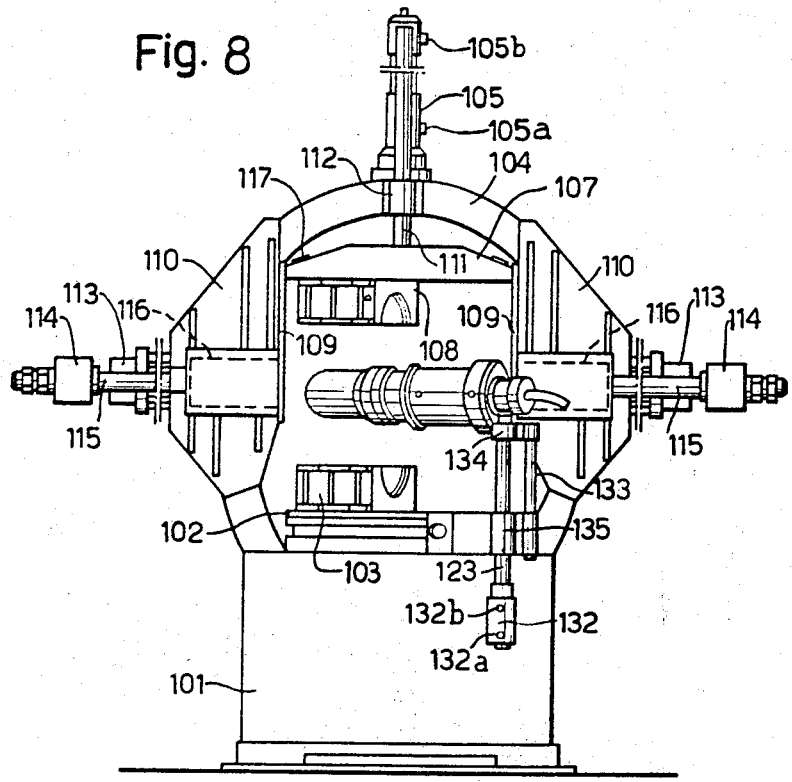
FIGURE 8 is an elevational view similar to FIGURE 7 showing the machine at the step following slipping away of the elbow from the supplemental core element having formed the inside of the elbow socket.
Figure 6:
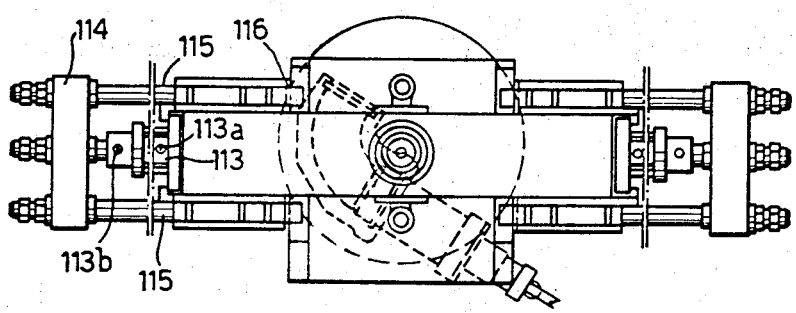
FIGURE 6 is a plan view of the machine according to FIGURE 5.

This mold, the structure of which is more clearly visible in FIGURES 2 to 4, is adapted to form elbows having straight end portions, one of which is of socket shape, and a curved intermediate portion. Standards 6′ are arranged at the sides of the frame 1 and support the ends of a top beam 7 on which a hydraulic or pneumatic double-acting ram 8 is centrally mounted.

A plate 9 is arranged beneath the beam 7 and has its opposite ends slidable in guide-ways 10, 11, in the standards 6′ and 6, respectively. The plate 9 is secured to the end of the stem 12 leading to the piston (not shown) of the ram 8. The plate 9 has secured thereto rods 13, 14 displaceably mounted in guide bushings carried by the beam 7. A structure 16 is secured to the lower face 15 of the plate 9, parallel with the top 2 and supports the top mold half 17 which is a specular image of the bottom mold half 4. The core cooperating with the mold is shown in part in proximity to the mold end nearer the standard 6′ shown in FIGURE 1. The core part denoted by arrow 19 is shown fully withdrawn from the mold.

Further features of the machine and operation thereof shall now be described with reference to FIGURES 2 to 4.

These figures, which show the mold half from below, additionally show the elbow 20 in a sectional view along the horizontal plane of symmetry of the mold. In the embodiment shown, the elbow 20 has been formed by injecting through a hole 21 in the mold half 17 a watery suspension of fibers mixed with a binder, such as asbestos fibers mixed with cement.

The core 19 comprises a main element having a rigid hollow body 22 formed in its wall with through holes. The body portion which is provided with a rubber casing 23, is supported by a cylindrical stem 24 secured to the free end of a bell crank 25 rotatably mounted about the axis 26. The axis 26, which extends perpendicular to the plane of the section taken in FIGURE 2, lies on the axis of curvature of the curved portion of the mold 4, 17 and cooperating core part.

In addition to the main element 22, 23 the core comprises two secondary elements 27, 28, respectively. The latter are in the form of rings made of resilient material, preferably rubber. They are so proportioned that when they are removed from the inside of the mold, the main core elements 22, 23 is free to rotate about the axis 26. The rubber rings 27, 28 are supported by closure plates 30, 31, respectively, adapted to close the opposite mold ends.

The ring 27 fills the annular space between the inner periphery of the socket end 20′ of the bend 20 and core 19. The ring 28, the inner end of which is bevelled, extends to the plane at which the constant curvature of the middle mold portion starts.

The plate 31 is carried by the stem 32 of a piston 33 slidably mounted in a double-acting cylinder 34 supported by the machine bed plate. The cylinder 34 is so proportioned and arranged to permit introduction of the ring 28 into the mold and closure of the corresponding end of the mold by pressing thereagainst the plate 31 and, alternatively, withdrawal of the plate 31 and full removal of the ring 28 from the mold, as shown in FIGURES 3 and 4.

The plate 30 forms the wall, which is nearer the core element 22, of a cylinder 35 slidingly fitted on the stem 24. An annular piston 36 securedly fixed to the stem 24 is arranged in the cylinder 35 and subdivides the internal hollow thereof into two sections 37, 38, respectively. Sections 37 and 38 can be connected with a pressure fluid source or, alternately, with an exhaust through conduits 39, 40, bored in part in the stem 24 and in the body of the piston 36. The stem is additionally formed with an axial conduit 41 connecting with the inside of the rigid core portion 22 in order to supply thereto pressure fluid which serves to expand the casing 23 during molding of the elbow 20.

Rotation of the bell crank arm 25, and consequently of the main core element 19 can be effected by a motor (not shown) which is likewise actuated by a pressure fluid. The motor can be arranged within the bed plate 1 and act on the shaft 26 to which the arm 25 is then connected by a splined coupling.

After the assembly of the mold halves 4 and 17 and introduction into the closed mold of the core elements 22, 23 and 27, 28, an aqueous slurry of fibers and a binder is injected through the hole 21 into the mold cavity confined between the inner wall of the mold halves, the outer walls of the core elements and, at the ends of the mold, by the plates 30 and 31. Immediately after the injection, fluid under pressure is introduced through the conduit 41 into the hollow body 22 of the core in order to expand the rubber casing 23 and the rings 27 and 28 fitted thereon. In this way, the aqueous slurry introduced into the mold cavity will be compressed from the inside and any excess water contained therein is expelled through the holes 5 provided in the walls of the mold halves 4 and 17. The stripping operation of the machine shall now be described starting from the position of the components shown in FIGURE 2 directly following completion of molding of the elbow 20.

In order to strip the molded elbow, pressure is released within the core by connecting the conduit 41 with exhaust. A pressure fluid is then supplied to the sections of the cylinders 34, 35 adjacent to the mold till the plates 30, 31 are removed from the opposite mold ends. Removal should be sufficient to permit full withdrawal of the rings 27, 28, which occurs only when the plates 30, 31 and rings 27, 28 attached to the former take the positions shown in FIGURE 3.

Having now removed all obstacles against free rotation of the main element 22, 23 of the core about the shaft 26, a motor can be operated which rotates the shaft 26 in the direction of the arrow 42 (FIGURE 3). Rotation stops when the main core element 22, 23 has been fully removed from the mold and has taken the position shown in FIGURE 4. When the core is in this position the mold can be opened by lifting its top half 17 and plate 9 by means of the ram 8, to clear access to the elbow 20, which can now be easily with-drawn from the machine.

It is understood that the return stroke of the cylinder 35 can be effected only after the arm 25 and stem 24 have been restored to their positions shown in FIGURES 2 and 3.

Obviously, the machine can be equipped with control means for automatically effecting the sequence of the various above described steps required for effecting removal from the machine of the elbow molded in the mold 4, 17.

The machine shown in FIGURES 5 to 11 comprises a bed plate 101 having arranged on its top a table 102 supporting the bottom mold half 103. The bed plate 101 additionally carries a portal-shaped frame 104 having in front view approximately a horse-shoe shape. The top of the frame 104 has secured thereto a vertically arranged double-acting ram 105. The piston rod 106 (the piston not being illustrated) is secured to the top face of the horizontal plate 107 carrying the top mold half 108.

Plate 107 slides on a pair of guide strips 109 carried by plates 110 secured on the opposite sides of frame 104. The plate 107 has moreover secured thereto cylindrical guide rods 111 extending above the top of the frame 104 through guide openings therein. The ram 105 is provided with fittings 105a, 105b, respectively, for supplying a pressure fluid beneath or above its piston, respectively, the other cylinder portion being connected to exhaust, whereby the plate 107 is lifted together with the mold half 108 from the mold half 103, or the mold is closed.

Rams 113 which are likewise of the double-acting type and horizontally arranged, are secured to the opposite sides of the vertical plane of symmetry of the frame 104, extending through the axes of the ram 105 and rods 111. The rams 113 can be fed with a pressure fluid through fittings 113a, 113b, respectively, in order to move the stems of their respective pistons in the required direction for drawing the cross beams 114 towards and away, respectively, from the said vertical plane of symmetry. The beams 114 are secured to the ends of the horizontal rods 115 ending by latches 116 slidably mounted in through openings bored in the middle portions of the plates 110. The latches 116 are so arranged as to place their free ends on the plates 117 fitted to the edge portions of the plate 107. The machine comprises in addition to the mold halves 103, 108 a core made up of a main element and two secondary elements which shall be described hereafter. The main element comprises a rigid core 118 fast with the stem 119 and an outer casing 120 fitted on the said rigid core and clamped thereto by a sleeve 121. The latter is in turn clamped against the flange 119a on the stem by a tapped collar 122 which is screwed on the screw threaded end 119b of the stem 119 and presses the bushing or "loop" 123a fitted on the said stem 119 and provided at the top of a vertical rod 123.

The sleeve 121 is formed with an external annular land 124 at both sides of which sealing rings 125a, 125b of resilient material seal against the inner wall of the cylinder 126 slidingly mounted on the sleeve 121. The cylidner 126 is subdivided by land 124 and seals 125a, 125b into two chambers connecting with the fitting 126a and fitting 126b, respectively, which can be connected with a source of pressure fluid, such as air or to exhaust. The face of the cylinder 126 turned towards the mold carries a rubber ring 127 slidingly mounted on the portion of the outer casing 120 fitted on the straight portion of the core 118 adjacent the stem 119. An opening is bored in the end wall of the mold closing the mold at its socket end, the stem 119 and ring 127 extending through the said opening. The core end 129 arranged within the rectilinear mold portion, forming the end section of the pipe joint remote from the socket, is of frusto-conical shape, the large base of the cone facing the inside of the mold. The mold is closed at this region by a wall 130, and a socket member 131 which is externally cylindrical is fitted during molding of the elbow on the frusto-conical portion 129 of the core, the bottom of the socket 131 being of a thickness such as to extend outwardly beyond the annular chamber in which the pipe joint is formed. This facilitates gripping of the socket 131 and removal thereof from the elbow during extraction of the latter from the mold, as described hereafter.

The vertical rod 123 whose top loop 123a supports the stem 119, extends through the double-acting vertical ram 132 fast with the table 102 supporting the mold half 103. The ram 132 is formed with fittings 132a, 132b leading to conduits (not shown) which can be supplied with pressure fluid or connected with exhaust in order to move the rod 123 carrying the stem 119 upwardly or restoring it downwardly. A constantly correct orientation of the core with respect to the mold parts is maintained through the provision of a guide rod 133 secured to the rod 123 by means of a cross member 134, slidable in a recess in a support 135 fast with the bed plate of the machine.

The machine operates as follows:

When the machine components are in the position shown in FIGURE 5, a cement-asbestos slurry is injected through the bore 136 into the mold which is closed as shown in FIGURE 9.

The slurry 137 fills the chamber in the mold confined between the outer casing 120 of the core and wire screen 138 lining the permeable walls of the mold halves 103, 108. On completion of injection a pressure fluid flowing from the axial conduit 139 bored in the core 118 and rod 119 is admitted between the rigid core 118 and casing 120. The resulting expansion of the casing 120 and core sections 127, 131 effects compression from the inside of the material injected into the mold and dehydration of the material through the wire screen 137 and holes 140 bored in the walls of the mold halves 103, 108. On completion of molding the mold is prepared for opening by withdrawing the latches 116 by means of the rams 113, the top mold half 108 being lifted by acting on the ram 105. The core and elbow formed thereon are then removed by lifting the rod 123 and stem 119 by means of the ram 132. On completion of these steps the components are in the positions shown in FIGURES 7 and 9.

Pressure fluid is then admitted to the cylinder 126 through connection 126a, while connection 126b is further connected with exhaust. This results in a displacement of the cylinder 126 to the position shown in FIGURES 8 and 10, to move the rectilinear annular member 127 to a position in which it does not hinder movement of the elbow with respect to the core along a curved path. The socket 31 is ultimately withdrawn by hand from the inside of the elbow.

Upon completion of the preliminary steps the elbow can be slipped off the core by rotating it, as indicated in FIGURE 11, substantially about the axis of curvature of the intermediate core portion. This is made possible by the fact that the pressure having previously expanded the casing 120 of the core and the secondary core elements 127, 131 has been released before opening the mold.

The sequence of the various above described steps and their timing can be determined manually, such as by actuating valves (not shown) interposed in the conduits connecting the opposite chambers in the various rams with a pressure fluid source or exhaust, or automatically from a centrally controlled timing device.

It will be understood that within the scope of this invention the process and machine described above can be employed for manufacturing elbows differing in cross section and width of their curved portion from those disclosed above and by utilizing materials other than asbestos cement, such as cellulose pulp or the like, provided the material can be compressed and dehydrated during molding. The various constructional details of the machine can be widely varied from the example described and shown without departing from the scope of this invention defined in the appended claims.

More particularly, the rings 27, 28 can be replaced by members of different shape such as of U- or segment shape provided they are such as to clear rotation of the main core element about the shaft 26 on their removal from the mold.

What I claim is:

1. A process for manufacturing curved pipe sections having straight end sections, one of the end sections being of socket shape, in an annular chamber formed between a curved split permeable mold and a curved expandable core made up of a plurality of parts, said process comprising:
   (a) introducing a watery slurry of a fibrous material and a binder into said annular chamber;
   (b) simultaneously compressing and dehydrating said watery slurry; and
   (c) stripping the pipe section from the core by
      (1) removing those parts of said core which would hinder withdrawal of the core from said pipe section, and
      (2) disengaging the remaining part of said core from said pipe section by subjecting the core and pipe section to relative rotational movement.

2. A process as defined in claim 1, wherein the remaining part of the core is disengaged from said pipe section contained in the mold by rotating the core about its axis of curvature which is also the axis of curvature of the inner surface of the mold.

3. A process as defined in claim 1 further comprising the step of removing the core and pipe section from the mold after the watery slurry has been compressed and dehydrated and before the pipe section has been stripped from the core; and wherein said disengaging step is effected by rotating the pipe section about the axis of curvature of the core.

4. A device for manufacturing curved pipe sections having straight end portions, one of which end portions being of socket shape comprising:
   (a) a permeable mold divided into separable top and halves which contact along a plane perpendicular to the axis of curvature of said pipe section, said mold having a curved central portion and straight end portions;
   (b) a core consisting of
      (1) a rigid hollow body having permeable walls,
      (2) a rubber jacket surrounding said hollow body, and
      (3) a pair of removable annular elements normally positioned on the ends of said hollow body and being shaped to form parts of the core which would normally hinder relative rotation of the core and the curved pipe section;
   (c) a chamber defined by said core and said mold and having the shape of the pipe section to be manufactured but with a smaller inner diameter;
   (d) means for introducing an aqueous slurry of fibers and a binder into said chamber; and
   (e) means for introducing pressure fluid into said hollow body.

5. A machine as defined in claim 4 wherein one of said annular elements is shaped to form the inner surface of the straight socket-shaped end of the pipe section, said one element being supported by the movable element of a pressure-fluid-operated double-acting ram for displacing said one element in the direction of its axis in order to extract it from its respective straight end portion of said pipe section and for restoring it to its normal position as required during the molding of the pipe section.

6. A machine as defined in claim 5 wherein said core is supported at its end forming the inner surface of the straight socket-shaped end of the pipe section by a rigid hollow stem extending from and coaxial with said end.

7. A machine as defined in claim 6 wherein said hollow stem supporting the core is carried by an arm mounted for rotation about an axis coaxial with the axis of curvature of the pipe section.

8. A machine as defined in claim 6 wherein said hollow stem supporting the core is supported for movement parallel to the axis of curvature of said pipe section by the movable element of a double-acting ram in order to make possible the extraction of the core with the curved pipe section formed thereon from a stationary one of said halves of the mold after the other half of the mold has been removed.

9. A machine as defined in claim 4 wherein said annular elements are supported on the movable elements of a pair of double-acting rams by a pair of plates, respectively, said plates closing the opposite ends of said chamber in which the pipe section is formed.

10. A machine as defined in claim 6 wherein the annular element forming the inner surface of the straight socket-shaped end of the pipe is carried by the adjacent annular wall of a cylinder slidably mounted on the hollow stem supporting the core which stem carries an annular stationary piston subdividing the internal hollow of the cylinder into two chambers each connected with a pressure fluid distributor in order to displace the cylinder and annular element carried by the latter.

11. A machine as claimed in claim 4 wherein the other of said annular elements of the core has a bottom wall at its end facing away from said chamber in order to facilitate handling.

References Cited

UNITED STATES PATENTS 2,267,817   12/1941   Costa _____ 162—233 X

DONALL H. SYLVESTER, *Primary Examiner.*

ALBERT C. HODGSON, *Assistant Examiner.*